Nov. 11, 1969  B. BETTEGA ET AL  3,477,227

ANTI-AIR POLLUTION DEVICE FOR INTERNAL COMBUSTION ENGINES

Filed March 5, 1968

INVENTORS
Bruno Bettega
George P. Stevens
BY
ATTORNEYS.

United States Patent Office 3,477,227
Patented Nov. 11, 1969

3,477,227
ANTI-AIR POLLUTION DEVICE FOR INTERNAL COMBUSTION ENGINES
Bruno Bettega, 179 Franklin St., Northvale, N.J. 07647, and George R. Stevens, 291 River Road, Bogota, N.J. 07603
Filed Mar. 5, 1968, Ser. No. 710,522
Int. Cl. F01n 3/02, 3/14
U.S. Cl. 60—30                        14 Claims

ABSTRACT OF THE DISCLOSURE

This specification discloses a method and apparatus for treating exhaust from an internal combustion engine to prevent air pollution. The muffler for the engine is located and constructed so that it receives the exhaust while the exhaust is still at high temperature, and the muffler is also a catalyst chamber in which carbon monoxide at high temperature reacts with oxygen to convert the carbon monoxide to carbon dioxide. Cupric oxide is used as the catalyst, and a limited amount of air is admitted to the upstream end of the muffler to supply the oxygen without diluting the exhaust so much as to cool it below the critical temperature for the catalytic reaction. The water vapor, or a substantial part of it, in the exhaust is condensed in the exhaust passage beyond the muffler; and the water is trapped and sprayed into the uncondensed remainder of the exhaust gases to wash particulate matter out of the exhaust stream and to drop the particle-carrying water on the street.

BRIEF SUMMARY OF THE INVENTION

The most objectionable constituents in the exhaust from internal combustion engines are the poisonous carbon monoxide and the air-polluting particulate matter caused by the incomplete combustion of hydrocarbon fuels.

This invention provides a method and apparatus by which both the carbon monoxide and particulate matter are removed from the exhaust gases with a minimum of equipment and cost. The muffler and the exhaust pipe beyond the muffler, which are standard parts of any automobile, are modified to provide the apparatus for removing carbon monoxide and particulate matter from the exhaust gas in accordance with this invention.

Carbon monoxide is removed by converting it to carbon dioxide while the exhaust gases are still hot enough for the carbon monoxide to be converted by the action of a catalyst, such as cupric oxide. The particulate matter is washed out of the exhaust gases by a scrubbing action of water sprayed across the stream of gas remaining after a substantial part of the water in the products of combustion has been condensed. Thus the products of combustion provide the water for washing the particulate matter out of the exhaust gases.

The water force spraying the gas stream is broken up to form a spray by aspirator action or by blast action of a portion of the exhaust gas stream in which enough pressure is preserved for the purpose, or by a combination of the aspiration and blast pressure.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DETAILED DESCRIPTION OF PREFERRED EMBODIMENT

Figure 1:
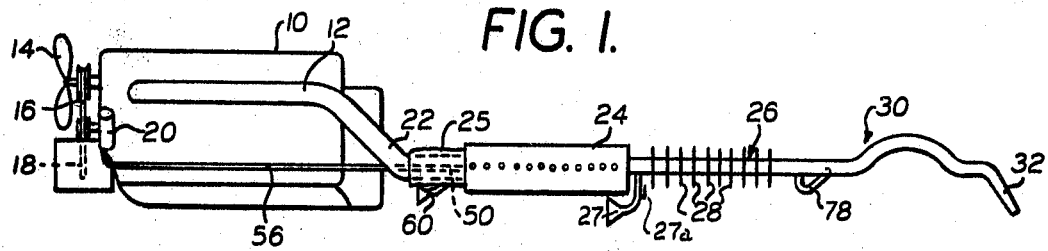
FIGURE 1 is a diagrammatic view showing an engine equipped with a muffler and exhaust system constructed in accordance with this invention.

FIGURE 1 shows an engine 10 having an exhaust manifold 12 and a cooling fan 14. The cooling fan 14 is driven by a belt 16 from a pulley 18, in the conventional manner. A small air compressor 20, supported from the engine 10, is also driven by the fan belt 16. This air compressor 20 is an optional element that can be used with the invention, if desired.

An exhaust pipe 22 leads from the manifold 12 to a muffler 24 which is also a catalyst chamber. The muffler is located closer to the engine than is conventional so that the exhaust gases from the manifold 12 are still at high temperature when they enter the chamber in the muffler 24. There is heat insulation 25 on the pipe 22.

Beyond the muffler 24 there is a downstream exhaust pipe 26 having cooling fins 28 attached to its outside surface and closely spaced from one another along the length of the pipe 26. In the construction shown in the drawing, these fins 28 are square but they can be made round or any other desired shape and their purpose is to dissipate heat from the pipe 26 so that the temperature of the pipe 26, and the gas flowing through the pipe, drops below the boiling point of water and causes the moisture in the exhaust gas stream to condense.

There is an air inlet 27 opening into the condenser for supplying air from the ambient atmosphere to assist in cooling the exhaust gases. A butterfly valve 27a in the inlet 27 can be adjusted from the outside to control the air flow.

Immediately beyond the end of the condenser, consisting of the exhaust pipe 26 and the fins 28, the exhaust gasses enter a spray chamber or scrubber 30 in which the gas stream is sprayed with water to wash out particulate matter which is trapped in the water and drips out in the water from an exhaust outlet 32.

Figure 2:
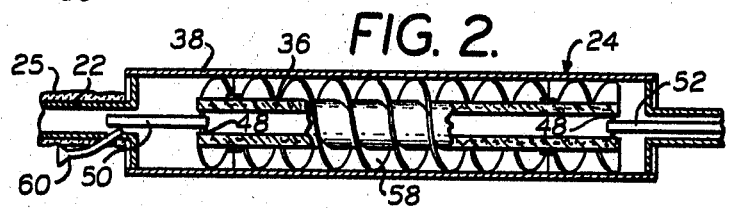
FIGURE 2 is an enlarged fragmentary sectional view of a portion of the apparatus shown in FIGURE 1.
Figure 3:
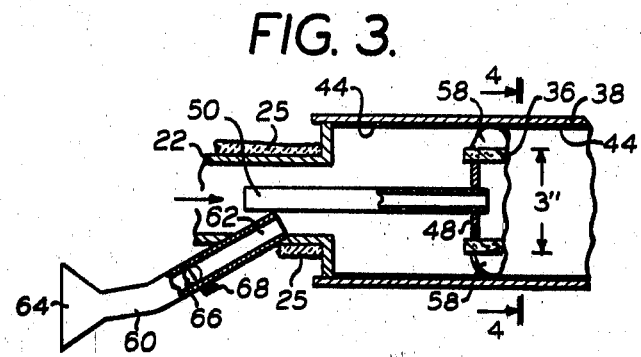
FIGURE 3 is a further enlarged fragmentary sectional view of one end of the muffler shown in FIGURE 2.
Figure 4:
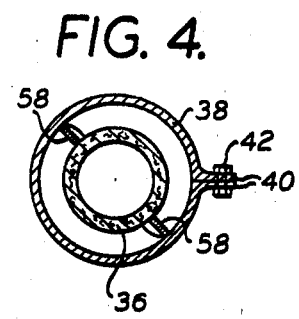
FIGURE 4 is a sectional view taken on the line 4—4 of FIGURE 3.
Figure 5:
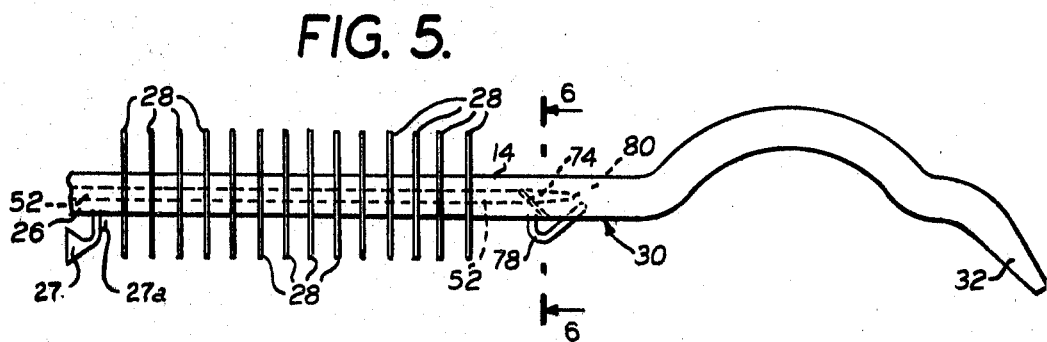
FIGURE 5 is an enlarged fragmentary sectional view of another portion of the apparatus shown in FIGURE 1.

FIGURES 2 and 3 show the construction of the muffler and catalyst chamber 24 in section and on a larger scale. There is a sleeve 36 in the muffler 24. This sleeve 36 has an outside diameter somewhat less than the inside diameter of a shell 38 which forms the side of the muffler. The shell 38 has flanged edges 40 clamped together by bolts 42 at spaced regions along the length of the muffler 24. By removing the bolts 42, the shell 38 can be taken off to provide access to the interior of the muffler.

The sleeve 36 is preferably formed of cupric oxide and it can be constructed so as to be porous or perforated to increase the surface area of the cupric oxide for contact with carbon monoxide present in the exhaust gases. Alternately, the sleeve 36 can be made of other metal with a coating of cupric oxide on both sides. To further increase the area of the cupric oxide within the muffler and catalyst chamber 24, a coating of cupric oxide 44 can be applied to the inside surface of the shell 38.

There are end plates 48 closing both ends of the sleeve 36 except for center openings in these plates 48. An upstream pipe 50 extends through the opening in the end plate 48 and a downstream pipe 52 extends through the opening in the downstream plate 48. The space within the chamber 24 upstream from the sleeve 36 is the primary oxidation chamber, much or all of the carbon monoxide being converted to carbon dioxide in this chamber, depending upon conditions of temperature and excess oxygen.

The purpose of the pipes 50 and 52 is to carry a stream of gas to the spray chamber 30 without having the pressure of the gas drop to the low level which occurs with the other gas that expands into the muffler 24 around the outside of the sleeve 36.

The pipe 50 can terminate at its upstream end, in the exhaust pipe 22 ahead of the muffler. When such is the case, the exhaust gas at the higher pressure which exists in the pipe 22, causes a stream of gas to flow through the pipe 50, sleeve 36 and pipe 52 to the spray chamber 30. If a stronger stream is desired, in order to get more pressure for spraying water in the chamber 30, the pipe 50 can be connected by another pipe 56 to the discharge outlet of the air compressor 20 (FIGURE 1).

The sleeve 36 is held in a center position in the muffler and catalyst chamber 24 by fins 58 which are preferably spiral so as to provide spiral passages between the outside surface of the sleeve 36 and the coating 44 on the inside surface of the shell 38. This promotes more intimate contact of the carbon monoxide with the cupric oxide catalyst and makes practical the use of a shorter muffler and catalyst chamber. Additional oxygen for combining with the carbon monoxide is supplied to the muffler and catalyst chamber 24 through an air supply pipe 60 opening into the muffler and catalyst chamber 24 near the upstream end of the chamber. This air supply pipe 60 is preferably located so that its outlet end 62 faces away from the direction of gas flow through the exhaust pipe 22 to produce an aspiration action for drawing air into the air supply pipe 60 from the ambient atmosphere.

The supply of air to the pipe 60 can be further increased by having a scoop 64 on the inlet end of the pipe 60 and facing in a direction to receive air as the automobile travels forward. Adjustment of the amount of air flowing through the pipe 60 is effected by a butterfly valve 66 located in the pipe 60 and adjustable by a handle 68 outside the pipe 60. It is advantageous to have excess oxygen for oxidizing the carbon monoxide in the muffler and catalyst chamber 24 but the admission of too much air through the pipe 60 will cool the exhaust gases, including the carbon monoxide, below 600° F., this being the critical temperature necessary to make the cupric oxide effective as a catalyst.

Figure 6:
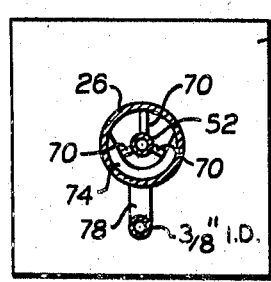
FIGURE 6 is an enlarged sectional view taken on the line 6—6 of FIGURE 5.

The pipe 52 extends centrally through the downstream exhaust pipe 26 and is held in its center position by spacers 70 (FIGURE 6). The gas which flows through the pipe 26 in the annular space between the pipe 52 and the inside surface of the pipe 26 is cooled to a temperature below the boiling point of water. Thus the moisture in the exhaust gas condenses and the drops of water run down the inside surface of the pipe 26 and are advanced along the pipe 26 by the motion of the gas stream.

A partition 74 in the pipe 26 traps the water as it travels out of the gas stream. This partition 74 is shaped so as to extend for a substantial distance up the sides of the pipe 26 and across the bottom of the pipe to trap a large percentage of the water drops that are advanced along the inside surface of the pipe 26 by the gas flow. Water that accumulates under the partition 74 drains into a spray pipe 78 which curves back through the side wall of the spray chamber 30 to a termination at a location part way across the open cross section of the spray chamber 30. The end of the spray pipe 78 faces away from the direction of the gas flow, and there is a nozzle 80 at the end of the pipe 52 and immediately adjacent the discharge end of the spray pipe 78 in position to aspirate water from the spray pipe 78 and to break the water stream up into droplets.

In order to get a scrubbing action which will wash particulate matter out of the gas stream, the water spray should have droplets which cause the gas to flow through a "rain" of water rather than a "fog." Minutely atomized water in the form of a mist or fog is less effective in removing particulate matter from the gas stream.

The spray of water from the spray pipe 78 closes the gas stream and strikes against the inside surface of the spray chamber 30. The velocity of the water is preferably sufficient to cause splashing and a secondary rain of water across the gas stream by the time the gas stream turns downward to the exhaust outlet 32. By directing the outlet 32 downward toward the ground, the water with the particulate matter entrained therein is spread on the ground; but if the exhaust outlet 32 is directed rearwardly, or with very little downward component of direction, the water will drip from the exhaust pipe and deposit the particulate matter on the ground, though under certain climatic conditions, some of the water will evaporate before depositing the particulate matter on the ground if the exhaust outlet 32 is not directed downward.

What is claimed is:

1. Apparatus for preventing air pollution by the exhaust from an internal combustion engine having an exhaust pipe, including in combination a chamber connected with the exhaust pipe close to the engine and into which the exhaust from the engine discharged while at high temperature, a catalyst in the chamber for promoting oxidation of incompletely burned fuel, a condenser including a chamber into which the gas from said chamber is discharged, and a scrubber at the downstream end of the condenser chamber with means for cooling water condensed in the condenser chamber and for spraying the water into the stream of exhaust gas flowing from the condenser chamber to remove particulate matter from said stream of exhaust gas.

2. The apparatus described in claim 1 characterized by the catalyst chamber being a muffler for the engine and the condenser being a length of tube with cooling fins thereon for cooling the condensation by transfer of heat through the fins to the ambient atmosphere.

3. The apparatus described in claim 2 characterized by the muffler being of substantially larger cross section than the exhaust pipe, and having a high pressure passage therethrough connected with the engine exhaust pipe upstream from the muffler and through which a portion of the exhaust gas passes without expanding into the larger cross section of the muffler, the high pressure passage leading to the scrubber and having a discharge end at the scrubber in a position to discharge a blast of gas across condensed water to break up the water into small drops for more effective scrubbing action.

4. The apparatus described in claim 3 characterized by both the interior of the muffler and the interior of the high pressure passage having a catalyst therein for contact with the gas to promote oxidation of carbon monoxide to carbon dioxide.

5. The apparatus described in claim 3 characterized by catalyst material on the inside surface of the muffler, a tube extending through the muffler and the interior of which provides the high pressure passage, both the interior and exterior surfaces of said tube through the muffler having catalyst material thereon for contact with gas passing through the tube and the muffler.

6. The apparatus described in claim 5 characterized by the means for cooling the condensed water being a rearwardly sloping baffle at the bottom of the tube and extending at least part way up the sides of the tube, but of less height at its center region between said walls, the scrubber having a water tube leading from the bottom of the condenser tube near the upstream side of the baffle and in position to drain from the condenser tube the water that accumulates behind said baffle, the water tube extending downstream beyond the baffle and then upwardly and having a discharge end in the gas stream of the scrubber extending in a direction having a downstream component, the high pressure passage having a nozzle discharge adjacent to the discharge end of the water pipe for aspirating water from the water pipe and for breaking the water stream into a rain that sprays across the cross section of the gas stream passing through the scrubber.

7. The apparatus described in claim 6 characterized by a tail pipe beyond the scrubber with a restricted outlet directed downward toward the ground for discharging at substantial velocity the water from the scrubber with the particulate matter entrained in the water.

8. The apparatus described in claim 1 characterized by the catalyst chamber being a muffler for the engine and having a baffle therein, the muffler having catalyst material on its inside surfaces including the surfaces of the baffle.

9. The apparatus described in claim 1 characterized by the catalyst chamber being in position to receive exhaust gas from the engine at a temperature greater than 600° F., and the catalyst being cupric oxide.

10. The apparatus described in claim 1 characterized by the catalyst chamber having a longitudinally extending sleeve therein of substantially smaller cross section than the inside cross section of the chamber and through which some of the exhaust gas flows, and the space in the chamber around the outside of the sleeve having a helical baffle therein for producing a tortuous path for the gas, there being catalyst material along the gas stream inside of the sleeve and also in the tortuous path.

11. The apparatus described in claim 9 characterized by the catalyst chamber being a muffler for the engine, the helical baffle being attached to the sleeve, and the longitudinally extending wall of the muffler being a wrap-around sheath with a longitudinal seam having outwardly extending flanges and detachable fastening means extending through the flanges for closing the seam, the wrap-around sheath being removable from the muffler when said detachable fastening means are removed from the flanges.

12. The apparatus described in claim 1 characterized by means for admitting controlled quantities of air from the ambient atmosphere to the exhaust gas stream upstream of the catalyst chamber to provide oxygen for oxidizing the partially burned fuel in the exhaust.

13. The apparatus described in claim 1 characterized by means for supplying gas under pressure to the scrubber at a location to break up the condensate into a rain of water drops across the gas stream passing through the scrubber.

14. The apparatus described in claim 13 characterized by the means for supplying gas under pressure being an air pump on the engine with its discharge pipe connected with the scrubber.

References Cited

UNITED STATES PATENTS

| 2,084,435 | 6/1937 | Deremer | 60—29 |
| 3,132,474 | 5/1964 | Fox | 60—30 |
| 3,142,150 | 7/1964 | Pearlman | 60—30 |
| 3,282,047 | 11/1966 | Wertheimer | 60—30 |

FOREIGN PATENTS 401,301  11/1909  France.

CARLTON R. CROYLE, Primary Examiner
DOUGLAS HART, Assistant Examiner

U.S. Cl. X.R.

23—288